United States Patent
Grimm et al.

(10) Patent No.: US 9,755,851 B2
(45) Date of Patent: Sep. 5, 2017

(54) METHOD AND APPARATUS FOR PLUG-IN WIRELESS SAFETY DEVICES

(71) Applicant: GM GLOBAL TECHNOLOGY OPERATIONS LLC, Detroit, MI (US)

(72) Inventors: Donald K. Grimm, Utica, MI (US); Upali Priyantha Mudalige, Oakland Township, MI (US); Bakhtiar B. Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/222,882

(22) Filed: Jul. 28, 2016

(65) Prior Publication Data

US 2017/0048080 A1    Feb. 16, 2017

Related U.S. Application Data

(60) Provisional application No. 62/203,988, filed on Aug. 12, 2015.

(51) Int. Cl.
| | |
|---|---|
| *G06F 7/00* | (2006.01) |
| *H04L 12/40* | (2006.01) |
| *H04L 12/24* | (2006.01) |
| *H04W 4/04* | (2009.01) |
| *H04W 12/10* | (2009.01) |

(Continued)

(52) U.S. Cl.
CPC .... *H04L 12/40032* (2013.01); *H04L 41/0809* (2013.01); *H04W 4/046* (2013.01); *H04W 12/10* (2013.01); *B60R 16/0231* (2013.01); *H04L 63/0823* (2013.01); *H04L 63/12* (2013.01); *H04L 67/12* (2013.01); *H04L 2012/40215* (2013.01); *H04L 2012/40234* (2013.01);

(Continued)

(58) Field of Classification Search
None
See application file for complete search history.

(56) References Cited

U.S. PATENT DOCUMENTS

| | | | |
|---|---|---|---|
| 8,930,041 B1 * | 1/2015 | Grimm et al. | 701/1 |
| 2009/0171528 A1 * | 7/2009 | Golde | G07C 5/0858 701/33.4 |

(Continued)

*Primary Examiner* — Brent Swarthout
(74) *Attorney, Agent, or Firm* — John A. Miller; Miller IP Group, PLC (57) ABSTRACT

An aftermarket vehicle communications device that that is part of a V2X communications system. The device can be a plug-in device, a wireless device separate from the vehicle, such as a key fob, wearable or a smart phone, or a permanent retrofit device mounted to the vehicle. The device is electrically coupled to the vehicle by, for example, an OBD connection, a USB connection, a CAN bus connection, an HDMI connection or wirelessly. The device includes a radio for transmitting and/or receiving communications signals, a memory for storing security information and vehicle application data, a location processor such as a global navigation satellite system receiver, a verification processor for verifying messages, and a communications processor configured to be put in electrical communication with a CAN bus on the vehicle, where the communications processor receives vehicle location signals from the location processor, files from the memory and signals from the radio.

20 Claims, 4 Drawing Sheets

(51) Int. Cl.
    *B60R 16/023*     (2006.01)
    *H04L 29/06*     (2006.01)
    *H04L 29/08*     (2006.01)

(52) U.S. Cl.
    CPC ............ *H04L 2012/40241* (2013.01); *H04L 2012/40273* (2013.01)

(56) References Cited

U.S. PATENT DOCUMENTS

| | | | |
|---|---|---|---|
| 2014/0200760 A1* | 7/2014 | Kaufmann | G07C 5/008 701/29.3 |
| 2016/0107646 A1* | 4/2016 | Kolisetty | B60W 30/16 701/96 |
| 2016/0147563 A1* | 5/2016 | Prakah-Asante | G06F 9/546 719/314 |

* cited by examiner

METHOD AND APPARATUS FOR PLUG-IN WIRELESS SAFETY DEVICES

CROSS-REFERENCE TO RELATED APPLICATIONS

This application claims the benefit of the priority date of U.S. Provisional Patent Application Ser. No. 62/203,988, titled, Method and Apparatus for Plug-In Wireless Safety Devices, filed Aug. 12, 2015.

BACKGROUND OF THE INVENTION

Field of the Invention

This invention relates generally to a vehicle communications device and, more particularly, to an aftermarket vehicle communications device that can be coupled to a vehicle's on-board diagnostic (OBD) connector, provided as a permanent retrofit device, or provided as a standalone wireless device, such as a smart phone or key fob, and that provides vehicle-to-vehicle (V2V), vehicle-to-infrastructure (V2I) or vehicle-to-entity (V2X) communications.

Discussion of the Related Art

Traffic accidents and roadway congestion are significant problems for vehicle travel. Vehicular ad-hoc network (VANET) based active safety and driver assistance systems, such as a dedicated short range communications (DSRC) system, known to those skilled in the art, allow a vehicle to transmit messages to other vehicles in a particular area with warning messages about dangerous road conditions, driving events, accidents, etc. In these systems, either direct broadcast communications or multi-hop geocast routing protocols, known to those skilled in the art, are commonly used to communicate warning messages, i.e., to deliver messages to vehicles that are within direct communication range or are located within a few kilometers from the road condition. In other words, an initial message advising drivers of a potential hazardous condition is transmitted from vehicle to vehicle either in a direct broadcast fashion or by using a geocast routing protocol so that vehicles within the desired application range will receive the messages of interest.

The communications systems referred to above include vehicle-to-vehicle (V2V) and vehicle-to-infrastructure (V2I) applications that require a minimum of one entity to send information to another entity. Broadly, short range communications that occur between a vehicle and any similarly equipped external object may be referred to as "V2X" communications. For example, many vehicle-to-vehicle safety applications can be executed on one vehicle by simply receiving broadcast messages from one or more neighboring vehicles. These messages are not necessarily directed to any specific vehicle, but are meant to be shared with a vehicle population to support the safety application. In these types of applications where collision avoidance is desirable, as two or more vehicles talk to one another and a collision becomes probable, the vehicle systems can warn the vehicle drivers, or possibly take action for the driver, such as applying the brakes. Likewise, roadway infrastructure components, such as traffic control units, can observe the information broadcasts or otherwise sense vehicle traffic and provide a driver warning if there is a detected hazard (e.g., if a vehicle is approaching a curve at an unsafe speed or there is a crossing vehicle that is violating a red traffic signal phase).

Since V2X communications is a cooperative technology, the system is dependent on other similarly equipped entities to provide safety benefits. As such, V2X systems are subject to the network effect, where the value of the system increases as the fleet penetration increases. In the early years of deployment, certain safety and other features may only be available in a limited fashion, as the number of communicating vehicles is not sufficient to provide safety benefits on a large scale. Existing vehicles without communications equipment will not be able to communicate with newer vehicles that have been deployed with a V2X communications system. Therefore, it may be desirable to provide an aftermarket device that is able to be used with an existing vehicle to allow that vehicle to be capable of providing vehicle location and state information to other vehicles and enable a variety of V2X features on the host vehicle using location and state information that is obtained from other communicating vehicles.

U.S. Pat. No. 8,930,041 issued Jan. 6, 2015 to Grimm et al., assigned to the assignee of this application and herein incorporated by reference, discloses an aftermarket plug-in safety device that allows a vehicle to communicate with other vehicles or infrastructures in a V2X communications system. The safety device is generally operable to be coupled to an OBD connector on the vehicle, and includes processing capabilities to identify the vehicle that it is coupled to by receiving data on a vehicle CAN bus, where the device performs self-configuring operations based on the type of vehicle, access to vehicle systems and location of the vehicle. The device also includes a radio for transmitting and receiving signals and a global navigation satellite system (GNSS) receiver for receiving location signals and providing vehicle position data. In this manner, the vehicle is able to communicate with other vehicles having similar communications capabilities.

Although the plug-in device disclosed in the '041 patent provides many advantages as an aftermarket device to allow a vehicle to be equipped with V2X communications, the ability of the device disclosed in the '041 patent can be expanded to provide additional features to include emerging technologies, such as smart phones, wearable's, standalone devices, and integrated devices.

SUMMARY OF THE INVENTION

The present invention discloses an aftermarket communications device that can be used in association with a vehicle to communicate with other vehicles or infrastructures in a V2X communications system. The communications device can be a plug-in device, a wireless device separate from the vehicle, such as a key fob, wearable or a smart phone, or a permanent retrofit device mounted to the vehicle. The communications device is electrically coupled to the vehicle by, for example, an OBD connection, a USB connection, a CAN bus connection, wireless connection or an HDMI connection. The communication device includes a radio for transmitting and/or receiving communications signals, a memory for storing security information and vehicle application data, a location processor such as a global navigation satellite system receiver, a verification processor for verifying messages, and a communications processor configured to be put in electrical communication with a vehicle CAN bus on the vehicle, where the communications processor receives vehicle location signals from the location processor, files from the memory and signals from the radio.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an aftermarket vehicle communications device is merely exemplary in nature, and is in no way intended to limit the invention or its applications or uses.

As discussed above, V2X communications systems are currently being developed that allow the vehicles that have these systems to communicate with one another so that these vehicles are able to provide warnings that can be received by the other vehicles. In an effort to provide safety benefits for those vehicles currently on the roadway that do not have V2X communications capabilities, the present invention proposes an aftermarket communications device that is capable of providing V2X communications when directly connected or wirelessly coupled to the vehicle. As will be discussed, the communications device can come in a variety of configurations including, but not limited to, a plug-in device that plugs into the vehicle OBD connector, a permanent retrofit device coupled to the CAN bus on the vehicle, a key fob that is carried by the vehicle operator and is wirelessly in communication with a receiver on the vehicle through Bluetooth or Wi-Fi, an application running on a smart phone, etc. The device can have transmit capabilities only, receive capabilities only or both transmit and receive capabilities. The device can be connected to the vehicle at any suitable and available location (e.g., diagnostics port, adjacent to an existing vehicle electronic control module using a junction connector, or into a new or existing accessory port such as USB or other interface that is provided by the OEM to accommodate brought in devices). The data interface to the vehicle can be in any suitable manner, such as the OBD connector, USB port, HDMI port, CV gateway, etc.

The communications device may have the ability to identify the vehicle's capabilities and parameters once it is in communication with the vehicle by receiving signals from the vehicle's controller area network (CAN) bus or other data bus (e.g. Ethernet) or wireless interface. The device may also provide information about the device to the vehicle CAN bus and may actuate a variety of in-vehicle systems (e.g., including, but not limited to, driver displays, audible chimes, haptic seat, braking, throttle or steering systems). For example, the device may be able to identify the make and model of the vehicle and specific on-board features that the vehicle may have, such as warning chimes, seat vibration, displays, etc. The communications device can be configured through the CAN bus, or can be configured by identifying the specific vehicle that the device is to be used in connection with. The device may self-configure system algorithms based on the determined capabilities and system security access, i.e., the authorized data set that is provided by the vehicle manufacture to the device, and may self-configure operational modes based on system security access and vehicle capabilities (e.g., if the vehicle does not provide any audible warning interface, the device may generate its own audible alerts). Self-configuration operations could be performed locally on the device itself or remotely, where the device provides data to a back office service that identifies the vehicle make and model information. Alternately, the device may be programmed for different vehicle makes and models, where one of those vehicles is selected for operation with that particular vehicle, where the specific on-board features will then be operational for that vehicle.

The communications device will also identify, typically through a satellite system, the location of the vehicle, and subsequently adhere to the operational standards that are in place for the identified region (e.g., over-the-air message format, congestion control mechanism, transmission frequency, etc.). The position of the device can be determined either on-board or off-board the vehicle in any suitable manner, such as GNSS, wireless ranging, visual detection by cameras on the vehicle, etc. Regional information can be determined from a local digital map database or from a cloud database API that provides access to country information. For example, different regions, such as the United States or Europe, have certain variations in radio channel usage, messaging protocols, application set, or application behavior. Also, some locations, such as satellite ground based station locations, do not allow communications at certain frequency bands. The device could identify when the vehicle is in proximity to one of these locations by accessing a database that is local to the device or stored remotely in the cloud and disable communications upon entry to one of these areas and resume communications upon exiting one of these areas. The device may provide a driver indication that the system is disabled when an entry into the restricted area has been determined. Such adaptations by region illustrate how location information can be used at a macroscopic level to configure device operation in accordance with regional standards. Within a particular region, road-level location information can enable other types of adaptations.

The communications device can be a plug-in device that can read camera or radar information over the vehicle CAN bus and identify surrounding vehicle scenarios, such as a vehicle hard-braking ahead of the subject vehicle without the need of GPS or V2V communications.

The communications device may self-configure feature priorities based on local real-time or historic traffic data, such as provide an indication when the vehicle is approaching a busy intersection, or by adapting the warning time at such locations, i.e., adjust the warning to a conservative setting. Additionally, feature sensitivity can be adjusted based on local environment, such as weather, increased sensitivity near schools (e.g., increasing the sensitivity of pedestrian detection applications) and rural areas (e.g., increasing the sensitivity of oncoming vehicle applications), and level of driver engagement, for example, the warning time is adjusted to a more conservative setting if the driver monitoring system is detecting that the driver is distracted, stressed or drowsy.

The communications device may also allow the user to configure or set parameters for the particular user so that the operation of the device can be personalized to that user, where these features may include such elements as warning timing (e.g., allow the user to adjust when alert is provided in accordance with their preferred driving style), which available features are enabled, etc. Once those features are set into the device, the settings will remain with the device so that if the device is taken from one vehicle to another vehicle, such as a rental car, those settings would automatically be used for the new vehicle. Configuring the system parameters for a particular user can be accomplished in a number of ways, such as by using a smart phone (the user could pair to the device and enter configuration settings on the smart phone device), using near field communications (NFC) (the user could specify the desired settings on a smart phone or laptop computer and use NFC to communicate the settings to the device), through Wi-Fi or Bluetooth devices, through OnStar™, etc. Further, a USB connection could be made to a laptop, where the laptop would recognize the device and bring up an application that enables the user to enter the desired device settings. Examples of features that could be turned on and off include warnings for vehicles traveling with hazard lights, disabled vehicle, hard braking vehicle, etc. Further, the device can be configured so that some features may be active when the vehicle is traveling above a certain speed. The user would have the option of specifying different speed ranges for different applications. Also, driver warnings could be configured by distance (e.g., an alert is provided if the host vehicle is within 250 meters of the event) or preferred notification time (e.g., an alert is provided if the host vehicle is within seven seconds of the event based on the current host vehicle speed).

Security for transmissions can be provided as appropriate, such as verifying all of the messages that are transmitted or only verifying those messages that are critical for a particular safety issue. Further, updates and other messages can be obtained in any suitable manner, such as through wireless or Bluetooth connections, or flashing system memory. Further, if the communications device is portable, it may be able to be connected into a lap top or other computing device for software updates. The message transmitted between vehicles as discussed herein must be secure to prevent hackers from broadcasting improper messages. In one known protocol, the messages are typically signed and authenticated using digital signatures based on an underlying public key infrastructure (PKI) in accordance with the IEEE 1609.2 standard specification. Each principal in a PKI system has a pair of keys, namely, a private key and a public key. The private key is known only to the principal and the public key can be shared with other entities in the system. The keys can be visualized as a pair of functions $P_r$ and $P_u$ representing the private and public keys, respectively, and having the property $M=P_r(P_u(M))$ and $M=P_u(P_r(M))$, where M is the message that is to be secured using the keys. To ensure message integrity, the sender of the message signs the message with its private key, and adds the signature to the message. Upon receiving the message, the recipient can verify the signature of the message using the sender's public key.

A fundamental problem in the PKI architecture is the exchange of the public keys without compromising them. One widely accepted solution is for a trusted entity, known as a certifying authority (CA), to digitally sign data structures, known as certificates, that state the binding nature between names and public keys. In the case of the IEEE 1609.2 standard, a certificate includes several fields, namely, the public key, geographic scope or region of the certificate, a certified revocation list series number associated with the certificate, the expiration time of the certificate and the signature of the CA. In order to verify the certificates signed by the CA, the public key of the CA must be available at each entity of the PKI system. Because the distribution of all of the certificates issued by the CA is impractical, the IEEE 1609.2 standard specifies that a sender should add its certificate to a signed message.

In one non-limiting embodiment, the messages transmitted by the communications device are signed with a certificate of the type discussed above, and those certificates are continually being updated for security purposes. It will eventually be necessary to provide new certificates to the device that are used to sign the messages. Various techniques are proposed to allow the device to receive the new security certificates, such as connecting the device to a laptop computer or taking the device to a dealership, the Department of Motor Vehicles, a certificate kiosk, etc.

The communications device may provide identity information to the vehicle, such as device type or manufacturer, third party subscriber information, etc. The access of the device to the various vehicle systems may be fully or partially granted according to any number of protocols or rules, which may be regional, original equipment manufacturer (OEM) specific, etc. Such access limitations enable device and/or vehicle manufactures to enter into licensing agreements and share the vehicle propriety data that enables specific V2X applications. Such a design also enables specific categories of devices that may be sold in the market, such as (1) transmit-only devices that provide simple vehicle awareness, (2) transmit/receive devices that provide driver warnings, or (3) more advanced devices that perform certain types of vehicle control functions. In this design, a vehicle manufacturer could grant access to vehicle systems based on the device type that is supplied by the device. Such classifications defined by the device manufacturer or OEM can be used to restrict access to vehicle data and/or enforce standard compliance, determine device certification status, restrict access to purchased services, etc. Different access levels may include access to vehicle information systems (such as vehicle sensors) non-safety related vehicle actuators that have both read and write capabilities, such as heated mirror on/off, or seat positioning system, vehicle displays including visual displays such as a driver information center, center stack, audible chime system or haptic interfaces. If so authorized, the device may have access to vehicle control systems, such as safety enhancing systems (e.g., headlight aiming, windshield wipers) and critical safety systems, such as braking, steering, throttle, etc.

Access granted by the device could depend on its location, for example, North America or Europe, where there may be different policies in place that govern the type of vehicle display or vehicle control operations that may be performed. Regional requirements may define congestion control mechanisms, such as the power of the transmitted message or the rate of the transmitted message. The region may also set security policies, such as how often the digital certificates are replaced or rotated. The device access and operation may be limited based on locality, where the device may be disabled in prohibited areas, such as near terrestrial satellite or military locations, safety features may run at higher rates at high risks areas, such as intersections, various feature functionalities can be adapted for different geographic locations and predicted level driver engagement, etc.

Figure 1:
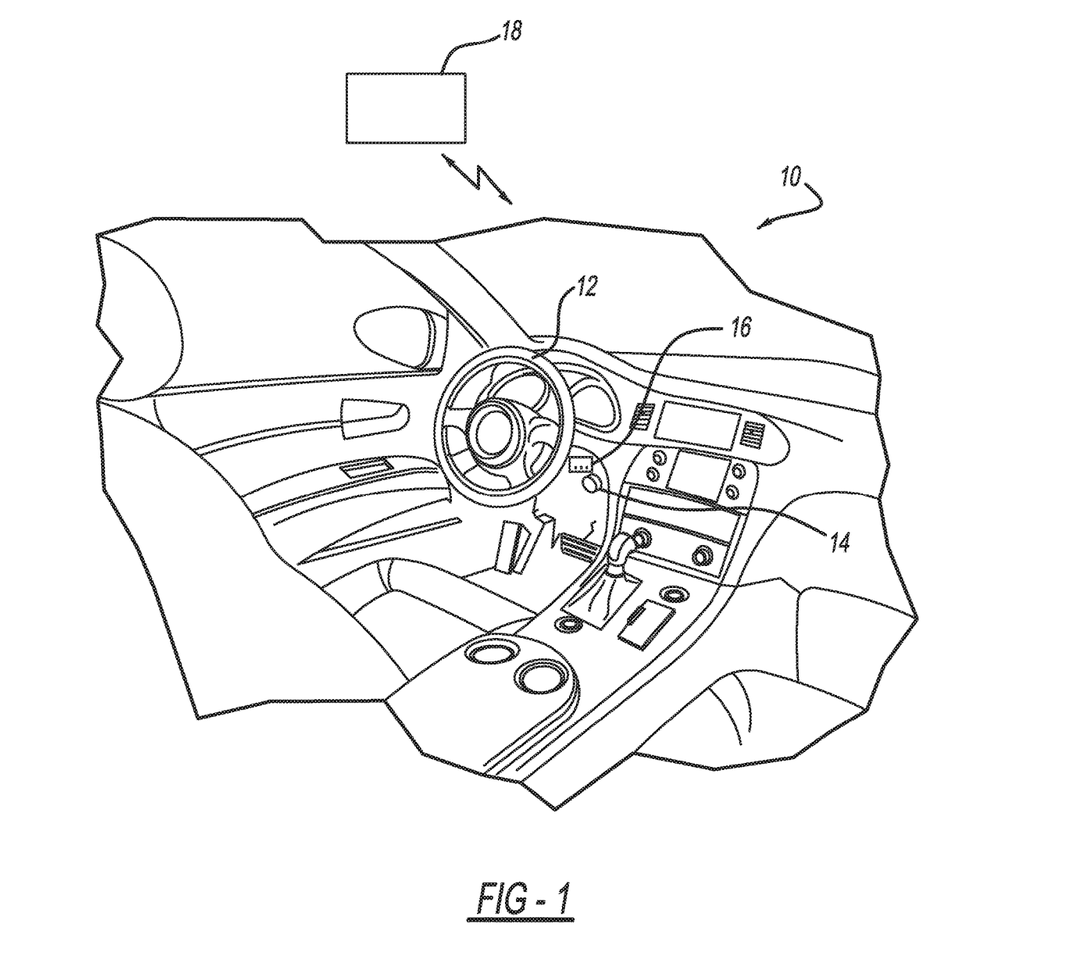
FIG. 1 is a cut-away isometric view of a vehicle interior illustrating a communications device.

FIG. 1 is a broken-away isometric view of an interior of a vehicle 10 having a steering wheel 12. The vehicle 10 also includes a communications device 14 of the type discussed above shown plugged into an on-board diagnostic (OBD) connector 16 under the steering wheel 12. This is by way of a non-limiting example in that the device 14 can be connected to the vehicle 10 at any suitable connection location using any suitable message protocol, where it would be able to receive signals from the vehicle CAN bus depending on the type of vehicle, the capabilities of the device 14, etc. The communications device 14 is also intended to represent any type of retrofit device provided as a permanent device on the vehicle 10, and may be located, for example, in the vehicle dashboard, in the vehicle roof, in the vehicle mirror, in the vehicle trunk, etc. Alternately, the communications device can be a wireless device, such as a key fob or smart phone, represented generally as device 18 and in communication with a receiver on the vehicle 10.

Figure 2:
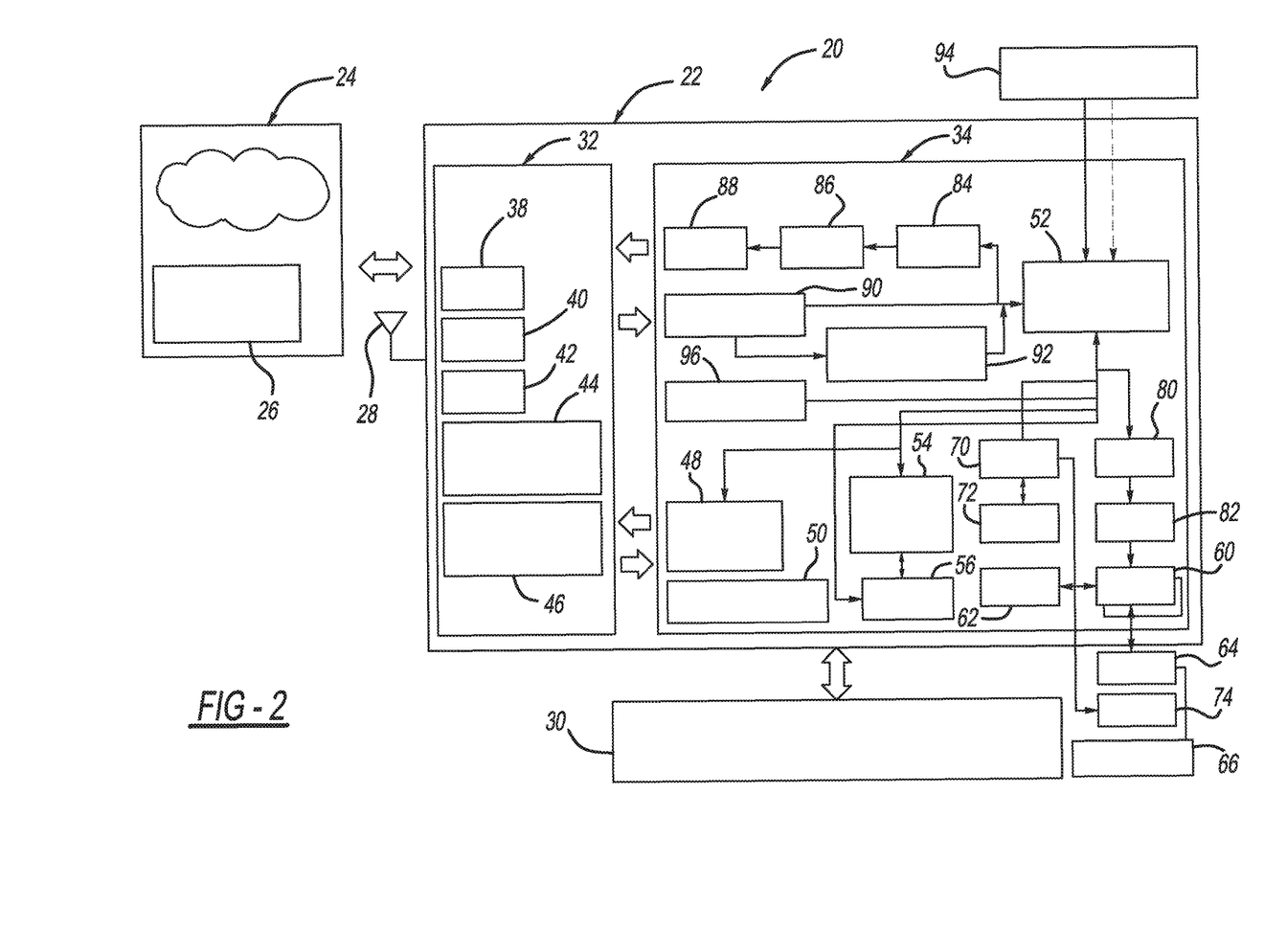
FIG. 2 is a schematic block diagram of a vehicle system including a V2X communications module and a display module.

FIG. 2 is a schematic block diagram of a vehicle system 20 including a V2X module 22 representing any one of the various communications devices discussed herein having one or more of the options and features discussed herein, and being able to transmit signals only, receive signals only or transmit and receive signals. Box 24 represents the internet and includes a hotspot 26 that allows the module 22 to be wirelessly connected to the internet through antenna 28, where messages can be sent, such as configuration messages, certification messages, applications, maps, positioning correction messages, etc., and where the hotspot 26 can be any suitable device, such as a Wi-Fi hot spot on the vehicle 10, a user smart phone hot spot, a roadside unit hot spot, etc. Alternately, a cellular modem (not shown) can be provided within the module 22 that allows it to be cellularly. connected to the internet.

The module 22 sends messages to and receives messages from a display module 30 on the vehicle 10. The signal connection between the modules 22 and 30 can be through a CAN bus, LIN, USB, Ethernet, HDMI, Wi-Fi, audio commands, etc. Display options include, but are not limited to, a vehicle center stack, a head-up display, steering wheel display, a built-in display on the module 22, etc. Further, the display module 30 can display certain graphics and text as provided by the module 22. The module 22 can provide signals to the display module 30, such as warning chimes, haptic seat, vibrate a smart phone or other wearable, etc. The module 30 can also provide user inputs to the module 22, such as sensitivity settings for conservative or aggressive drivers, certain types of alerts, system behavior inputs, user preferences, etc.

The V2X module 22 includes a vehicle interface microcontrol unit (MCU) 32 and a host MCU 34. The vehicle interface MCU 32 acts a protective layer or firewall for potentially harmful messages received by the module 22. The vehicle interface MCU 32 includes an HDMI box 38, a CAN box 40 and a USB box 42 that are intended to represent the various protocols in which the module 22 can receive and/or transmit messages through the antenna 28, where typically only a single access protocol would be employed. The vehicle interface MCU 32 also includes an authentication engine 44 that provides the security logic that allows the MCU 32 to communicate with the MCU 34 and obtain vehicle data therefrom. The MCU 32 further includes a certificate update manager 46 that allows an outside tool, either wirelessly or hardwired, to be coupled to the module 22 so that PKI certificates or other security protocols can be updated. The certificate update manager 46 is coupled to a certificate manager 48 on the host MCU 34 through any suitable connection means, such as Bluetooth, Wi-Fi, NFC, RFID, etc., represented generally by box 50, for controlling and updating the PKI certificates or other security messages. The certificate manager 48 has applicable infrastructure, such as those mentioned above, that processes requests for, generates and delivers security certificates to users and maintains and delivers certificate revocation lists (CRLs).

The MCU 34 includes the various algorithms, protocols, devices, hardware, etc. to provide the message analysis and message exchange as discussed herein. Those various algorithms and protocols are provided in a V2X core functions and features processor 52 that receives and/or transmits data to various functionality on the MCU 34. The MCU 34 also includes a suitable memory 54 and digital storage 56 that stores data necessary to run the algorithms and protocols in the processor 52, such as security certificates, CRLs, application data, etc.

The MCU 34 also includes a DCRC radio 60 that receives and/or transmits the V2X communication signals and messages that may be up-converted for transmission, down-converted for reception, amplified, filtered, converted between analog and digital signals, etc. The received signals are converted from analog signals to digital signals and then sent to the processor 52 and digital signals from the processor 52 for transmission are converted to analog signals for up-conversion. Other types of radios can also be used, such as Wi-Fi radios, Bluetooth radios, long term evolution (LTE) radios, etc. The radio 60 can receive V2X communications signals from a V2X antenna 62 that is on the module 22 or a V2X antenna 64 external to the module 22. Additionally, a secondary radio 66 or multiple radios can be provided, where the multiple radios can communicate over DSRC, Wi-Fi, Bluetooth, LTE, etc. at the same time.

All of the messages from the processor 52 that are to be transmitted by the radio 60 can be verified at box 80 and signed at box 82 prior to being transmitted. Alternately, the verification process can be eliminated in the transmission step for all of the messages being transmitted, and only those messages from the processor 52 that are alerts at box 84 can be verified at box 86, which are then notified at box 88. Particularly, before issuing an alert at the box 84, the module 22 may verify the message, unless already verified as a result of every incoming message being verified, and if the message is authentic, the module 22 will provide an alert to the driver using the display module 30 and determined by the processor 52 using the sensor information.

The MCU 34 includes a global navigation satellite system (GNSS) receiver 70 that receives GPS signals, where the receiver 70 provides time keeping signals to the radio 60 and vehicle position signals to the processor 52. Such a GNSS system may include the existing GPS, Galileo, etc. systems and/or ground-based systems that provide their own location information or augment the satellite based systems. The GNSS system may also employ satellite based position augmentation signals. Some device embodiments may utilize the existing positioning system of the vehicle from data that is obtained through the vehicle serial data bus. The receiver 70 may receive GPS signals from a GPS antenna 72 on the module 22 or a GPS antenna 74 external to the module 22.

The module 22 may receive sensor data at box 90 from any sensor on the vehicle 10 that is applicable for the V2X module 22. That sensor data can be sent directly to the processor 52, or can go through a self-configuration box 92 for security purposes to identify message ID, diagnostic trouble codes, etc. Alternately, the configuration process can be provided outside of the module 22 at box 94 that provides user configuration of the module 22, such as vehicle selection. In one non-limiting design, specific sensors 96 can be provided in the module 22, such as accelerometers, cameras, etc.

Figure 3:
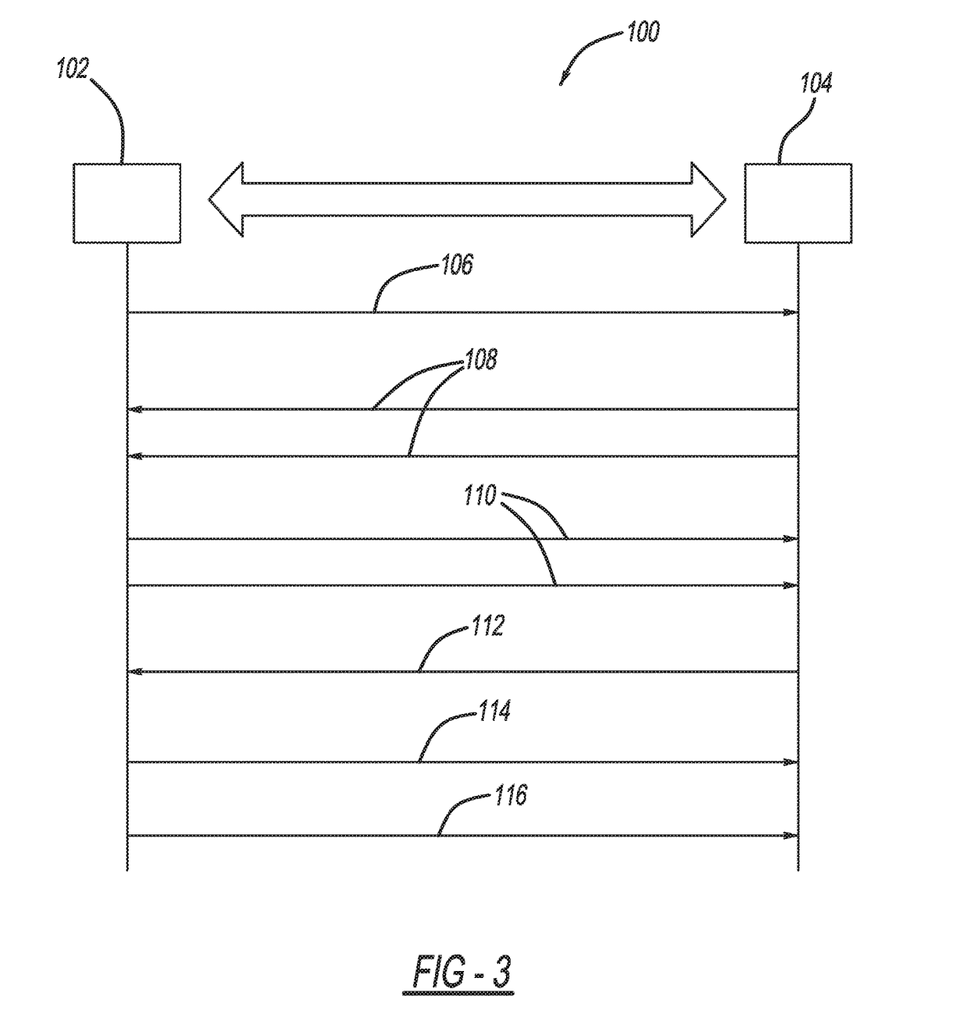
FIG. 3 is an illustration of messages sent between the V2X communications module and the display module.

FIG. 3 is an illustration 100 showing an example of message transfer between a V2X module 102 representing the V2X module 22 and a display module 104 representing the display module 30 in an open display interface protocol, which is a session type communication. When the V2X module 102 processes data, such as a safety event, that it wants to display to the vehicle driver, it will send an event notification request on line 106 identifying what data and information it wants to display on the display module 104. That session data could be any data or information that is applicable for the particular system and event, and could include a display ID, a display request, such as certain dialog or text, a menu list, navigation information, graphic information, how the display should be graphically laid out and access credentials of the module 102. After the display module 104 has processed the session data request and verifies it, the display module 104 sends an event data request for attribute data on lines 108, which could be titles, text frames, button texts, items, maneuver icons, graphic frames, chimes, etc. The V2X module 102 provides that data on lines 110 to the display module 104, where it is displayed. The display module 104 then sends an action data message on line 112 back to the V2X module 102 for action that the user may need to take, such as button selection, lists selection, touch screen, etc. The module 102 then sends an event termination message on line 114 and a status indication of the data on the line 116.

Figure 4:
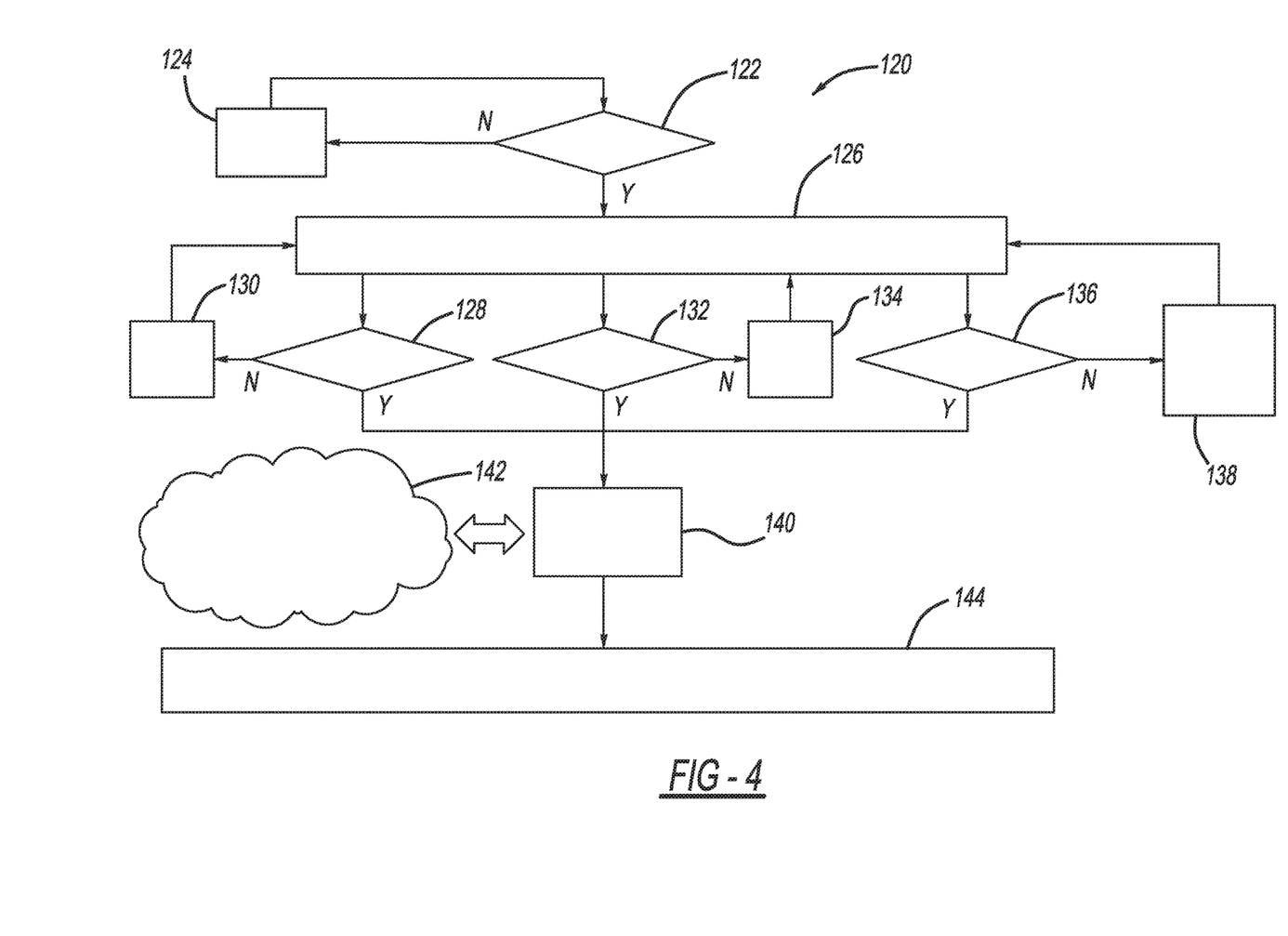
FIG. 4 is a flow chart diagram showing communications device operation logic.

FIG. 4 is a flow chart diagram 120 illustrating high level device operation logic for the communications device discussed above. At decision diamond 122, the algorithm determines whether the vehicle ignition is on, and if not, shuts the device down at box 124. If the vehicle ignition is on at the decision diamond 122, then the algorithm determines what type of device is being used as box 126. For example, if the device is a plug-in device, then the algorithm will determine if the device has been authenticated at decision diamond 128, and if not, an authentication key may be installed at box 130. If the device is a wireless device, then the algorithm may determine whether the device has been properly paired at decision diamond 132, and if not, go through a pairing process at box 134. If the device is a permanent retrofit device, the algorithm may determine whether the device has been properly programmed at decision diamond 136 and if not, device learning may be performed at box 138. If the device is properly authenticated at the decision diamond 138, or properly paired at decision diamond 132 or properly programmed at the decision diamond 136, then the device is ready for the V2X communications operations discussed above at box 140 and is coupled to the internet 142, where the various alerts, such as visual, auditory, tactile, in-vehicle, external to the vehicle, pair devices, etc. may be employed at box 144.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A communications device provided in connection with a vehicle, said communications device comprising:
    at least one radio for transmitting and receiving communications signals;
    a memory for storing security information and vehicle application data;
    a location processor for providing vehicle position data;
    a verification processor for verifying messages received by the radio; and
    a communications processor configured to be put in electrical communication with a data bus on the vehicle, said communications processor receiving vehicle location signals from the location processor, files from the memory and signals from the radio, where the communications processor is configured to use the vehicle location signals to determine a set of regulatory standards including frequencies used by the radio, power and rate of transmitted messages, and types of control commands issuable by the communications device.

2. The communications device according to claim 1 wherein the communications device is a plug-in device operable to be selectively coupled to a connector on the vehicle.

3. The communications device according to claim 2 wherein the connector is an on-board diagnostics connector.

4. The communications device according to claim 2 wherein the plug-in device can read camera or radar data from a vehicle CAN bus.

5. The communications device according to claim 1 wherein the communications device is a wireless device separate from the vehicle and being wirelessly coupled to the vehicle.

6. The communications device according to claim 5 wherein the communications device is a key fob, a wearable or a smart phone.

7. The communications device according to claim 1 wherein the communications device is a permanent retrofit device coupled to the vehicle.

8. The communications device according to claim 1 wherein the communications device is coupled to a display module that displays visual graphics and text as requested by the device.

9. The communications device according to claim 8 wherein the communications device is coupled to the display module by one of the group selected from vehicle controller area network (CAN) bus, LIN, USB, Ethernet, HDMI, wireless, and audio commands.

10. The communications device according to claim 1 wherein the at least one radio is selected from the group consisting of a dedicated short range communications (DSRC) radio, a Wi-Fi radio, a Bluetooth radio and a long term evolution (LTE) radio.

11. The communications device according to claim 1 wherein the radio receives and transmits signals through an antenna located on the device or external to the communications device.

12. The communications device according to claim 1 wherein the communications device is coupled to the vehicle through a USB connection, a vehicle controller area network (CAN) connection, an HDMI connection or wirelessly.

13. The communications device according to claim 1 wherein the data bus includes vehicle controller area network (CAN) buses or Flexray buses.

14. The communications device according to claim 1 wherein the verification processor verifies every message or verifies only select messages.

15. The communications device according to claim 1 further comprising sensors detecting vehicle operation.

16. The communications device according to claim 1 wherein the location processor is a global navigation satellite system (GNSS) receiver.

17. The communications device according to claim 16 wherein the GNSS receiver employs an antenna on the communications device or external to the communications device.

18. The communications device according to claim 1 wherein the communications device employs user-configuration external to the device or self-configuration internal to the communications device.

19. A plug-in communications device provided in connection with a vehicle, wherein the plug-in device can read camera or radar data from a vehicle CAN bus, said communications device comprising:
- at least one radio for transmitting and receiving communications signals, wherein the at least one radio is selected from the group consisting of a dedicated short range communications (DSRC) radio, a Wi-Fi radio, a Bluetooth radio and a long term evolution (LTE) radio;
- a memory for storing security information and vehicle application data;
- a location processor for providing vehicle position data;
- a verification processor for verifying messages received by the radio; and
- a communications processor configured to be put in electrical communication with a data bus on the vehicle, said communications processor receiving vehicle location signals from the location processor, files from the memory and signals from the radio, where the communications processor is configured to use the vehicle location signals to determine a set of regulatory standards including frequencies used by the radio, power and rate of transmitted messages, and types of control commands issuable by the communications device.

20. A communications device provided in connection with a vehicle, said communications device comprising:
- at least one radio for transmitting and receiving communications signals;
- a memory for storing security information and vehicle application data;
- a location processor for providing vehicle position data;
- a verification processor for verifying messages received by the radio; and
- a communications processor configured to be put in electrical communication with a data bus on the vehicle, wherein the data bus includes vehicle controller area network (CAN) buses or Flexray buses, said communications processor receiving vehicle location signals from the location processor, files from the memory and signals from the radio, wherein the communications device is coupled to a display module by one of the group selected from vehicle controller area network (CAN) bus, LIN, USB, Ethernet, HDMI, wireless, and audio commands, and wherein the communications device is coupled to the vehicle through a USB connection, a vehicle controller area network (CAN) connection, an HDMI connection or wirelessly, and where the communications processor is configured to use the vehicle location signals to determine a set of regulatory standards including frequencies used by the radio, power and rate of transmitted messages, and types of control commands issuable by the communications device.

* * * * *